KEYED AUTOMATIC GAIN CONTROL WITH KEYING PULSE LIMITER

Filed Aug. 26, 1948 2 Sheets-Sheet 1

Inventor
Karl R. Wendt
By
[signature]
Attorney

KEYED AUTOMATIC GAIN CONTROL WITH KEYING PULSE LIMITER

Filed Aug. 26, 1948 2 Sheets-Sheet 2

Inventor
Karl R. Wendt
By [signature]
Attorney

Patented Oct. 6, 1953

2,654,799

UNITED STATES PATENT OFFICE 2,654,799

KEYED AUTOMATIC GAIN CONTROL WITH KEYING PULSE LIMITER

Karl Rinner Wendt, Hightstown, N. J., assignor to Radio Corporation of America, a corporation of Delaware Application August 26, 1948, Serial No. 46,254

1 Claim. (Cl. 178—7.5)

This invention relates to automatic gain control systems for use in radio receivers adapted to receive image signals having synchronizing and black level (blanking) information included therein and more particularly for use in present day television receiver systems.

The present invention deals more particularly with keyed automatic gain control systems of the type requiring the application of constant amplitude keying pulses and is particularly useful in connection with an inverted form of keyed AGC system of the type, for example described by Karl R. Wendt in U. S. Patents 2,637,772, issued May 5, 1953 and 2,586,193, issued February 19, 1952, which operate to control the degree of amplification of the video signals afforded by the television receiver in accordance with the intensity of the radio carrier received during the synchronizing or blanking intervals. In order to achieve the action described by the aforementioned references use is made of a gated amplifier or conduction device which responds to a series of applied keying pulses. More particularly in the above identified U. S. Patents, a source of such keying pulses is indicated as being conveniently available from the deflection circuit of the television receiver in which the automatic gain control is incorporated. As will be seen hereinafter, subsequent to a brief consideration of automatic gain control circuit characteristics, such a source of keying pulses although eminently suitable from a timing standpoint, does in some instances admit to certain inaccuracies in circuit operation due to variations in the amplitude of the keying pulses inherently produced thereby. More particularly is this true in connection with a television receiver incorporating combination deflection circuits which not only provide deflection energy for the kinescope electron beam but also supplies energy for the actual acceleration of the beam within the tube.

It is commonly known that the automatic gain control circuits for use in television receiving equipment differ greatly from the more frequently encountered automatic gain control circuit embodied in receivers for sound broadcast signals. In the instance of the usual broadcast receiver designed for the reception of amplitude modulated carriers, it is deemed adequate that the automatic gain control potential be produced by electrical information gleaned from the average carrier intensity of the received radio signals. Clearly such an automatic gain control circuit would not be satisfactory for controlling the gain of television receiver video channels as the average signal strength of the radio frequency carrier is a function of the average image or picture brilliance sometimes referred to as "background level." As pointed out in the aforementioned applications by Karl R. Wendt, development of an automatic gain control voltage in accordance with the average signal strength of the received radio carrier would cause the gain to be changed not only in accordance with the signal intensity variations of the received radio carrier due to undesirable fading or other atmospherical phenomena, but also in accordance with average picture brilliance of the image being transmitted.

Radio transmitted "negative modulated" television signals normally include blanking pulses or black level information which data is transmitted between each image line in combination with the line synchronizing pulse. This line sync pulse is most commonly superimposed upon the black level signal and these data are transmitted at maximum carrier intensity, or 100 percent carrier amplitude, while the black level or blanking pulse is transmitted at approximately 75 percent of the full carrier amplitude. The blanking impulse or black level in accordance with present R. M. A. television synchronizing wave form standards is of the order of 16 to 18 percent of a line interval with the sync impulse having a period of approximately 8 percent of a line interval. Sync impulses when superimposed upon the blanking or black level signals are stationed between the extremities of the blanking interval so as to form what is commonly termed a "front porch" and a "back porch" on the pedestal-like waveform structure formed by the combined sync signal and blanking impulse. The front porch interval is approximately 2½ percent of the line interval and represents the time between the leading edge of each black level signal and the leading edge of the line sync pulse, whereas the back porch interval of approximately 6 percent of a line interval, is equivalent to the time interval between the end of the line sync pulse and the termination of the black level or blank out signal.

The amplitude of the radio frequency carrier as previously brought out is held constant during the transmission of all blanking and sync impulse information. During the transmission of image intelligence of the television signal, that is, during each line interval between successive blank signals, the average amplitude of the transmitted radio frequency carrier is a function of the average light contained in the television image. Accordingly, if the reproduced image is to be predominantly dark, the average carrier amplitude will necessarily be greater than would be the case if the background level of the image were considerably lighter, such action of course is true only in the negative system of transmission wherein white picture information is transmitted at a lower carrier level than black level information. It is expedient in order that the control of the gain of the receiver be in accordance with the proper aspects of the carrier, that the automatic gain control potential be developed such that its magnitude is a function of the intensity of the received carrier of the television signal during the blanking or sync intervals only and, as hereinbefore brought out, not during the transmission of the picture or line information.

In order to extract carrier strength information from the television signal at periods corresponding to blanking or sync intervals use may be made of keyed circuits which translate signal information only during the keyed state of the circuit. In this manner, and as more fully described in the aforementioned applications of Karl R. Wendt, supra, an automatic gain control potential may be developed which is substantially free of noise effects and is to be much preferred over the automatic gain control action derived from simple peak rectifier systems which are quite vulnerable to spurious energy bursts at any time during the reception of the signal. Also with the keyed type of AGC a properly arranged circuit will ideally display 20 times the noise immunity possible in unkeyed automatic gain control circuits. However, in some forms of AGC systems heretofore proposed, the AGC potential as developed by the system is rendered a function of the amplitude of the applied keying pulses. Therefore, should the amplitude of the keying pulses vary during reception of a signal, misinformation would be provided to the signal amplifying circuits to produce an undesired change in signal intensity at the image viewing device. In the instances where the keying pulses are derived from the deflection circuit and said deflection circuit also provides energy for acceleration of the electron beam within the kinescope, a change in received picture background level produces corresponding changes in loading upon the deflection circuit and causes the derived keying pulses to change in amplitude in accordance with picture content. It is evident that such conditions are extremely unfavorable and substantially reduce the overall picture quality produced by the television receiver.

According to the present invention the deleterious effects of keying pulse amplitude variation in keyed AGC systems are substantially eliminated by means of providing limiting means to restrict the amplitude variations of the keying pulse as it is applied to the keying circuit. The present invention provides such limiting action in connection with receivers using keying pulses derived from the kinescope deflection circuit, through the employment of very little additional equipment and consequent cost of supplemental circuit structure.

Therefore, it is the purpose of the present invention to provide an improved keyed automatic gain control circuit, which is simple in operation and suitable for embodiment in standard television receivers.

It is another purpose of the present invention to provide keying pulse energy for keyed automatic gain control circuits finding use in television receivers such that the action of the automatic gain control circuit is substantially independent of variations in the operation of the source of keying pulse energy.

It is another object of the present invention to extract and properly control automatic gain control keying pulse signals from television receiver deflection circuits of the type providing both kinescope electron beam accelerating energy and electron beam deflection energy, whereby the operation of the automatic gain control circuit is rendered substantially independent of picture background information.

The novel features which are believed to be characteristic of the present invention and set forth in the appended claim, the invention itself however as to both its organization and method of operation will be best understood from the teaching of the following description especially when considered in connection with the accompanying drawings wherein:

In the drawings, like elements are assigned like reference characters.

Figure 1:
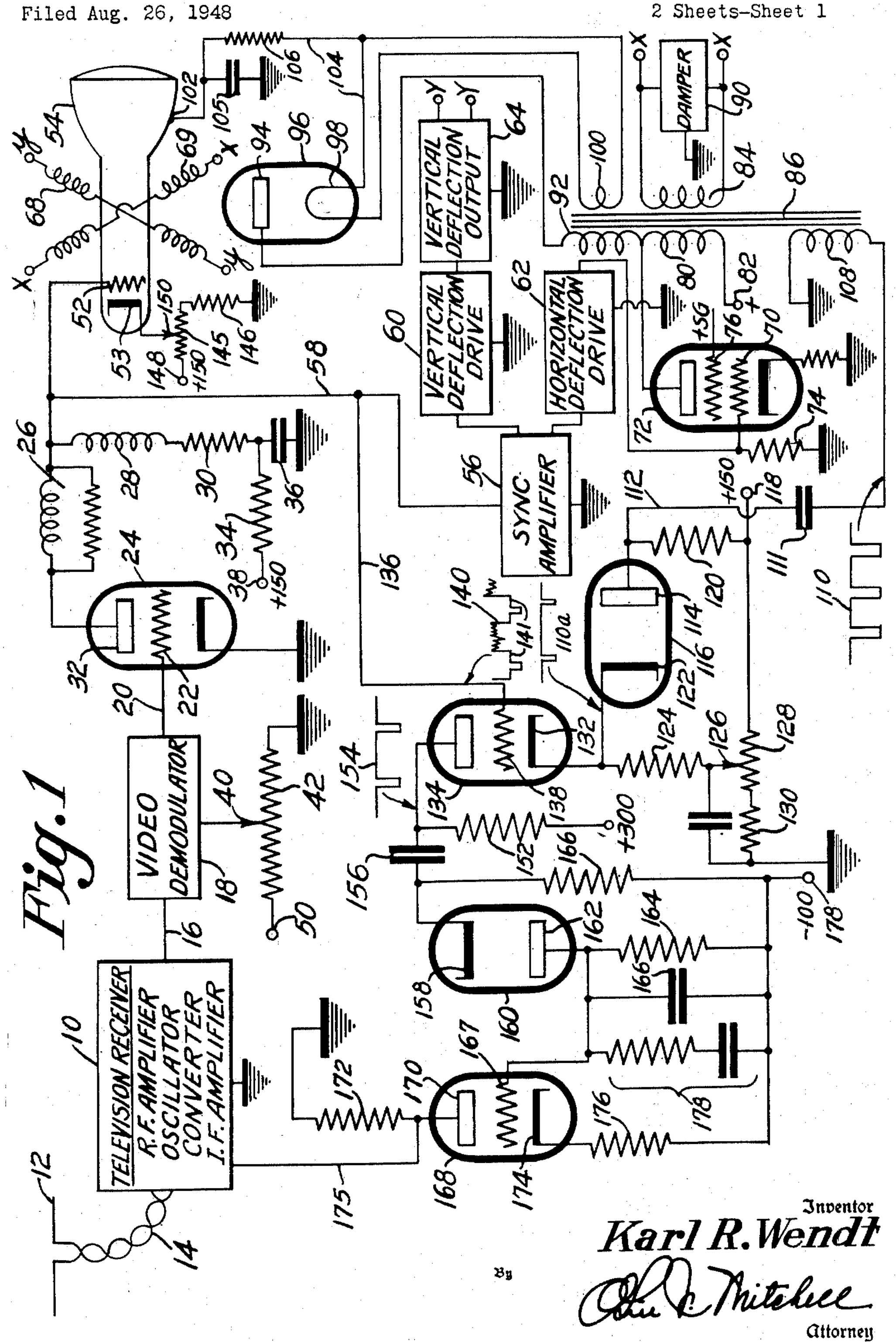
Figure 1 is one embodiment of the present invention as applied to a conventional television receiving circuit.

Referring now to Figure 1, there is indicated in block 10 certain well-known components of a conventional television receiver including the R. F. amplifier, the oscillator, the first detector or converter, and the intermediate frequency amplifier. The signals are picked up by antenna 12 and through the medium of transmission line 14 are applied to the input of the receiver as shown.

Typical and suitable components of the receiver as well as other components employed in the practice of this invention are shown and described in the book entitled "Principles of Television Engineering" by Donald G. Fink. The output of the intermediate frequency amplifier included in block 10 is suitably connected through path 16 through the video demodulator 18, which is also shown in block form. The demodulator 18 demodulates the video intermediate frequency carrier to produce the image signals including blanking and sync information and subsequently applies the same via a direct current coupling path to grid 22 of vacuum tube 24. The vacuum tube 24 is connected for operation as a video frequency amplifier being typically provided with frequency compensation by means of elements 26, 28 and 30 connected in series with the polarizing potentials for the anode 32. Also connected in series with the polarizing potentials path for the anode, is decoupling resistor 34 which acts in conjunction with by-pass 36 to isolate video amplifier plate current changes from +150 voltage polarizing potential terminal 38.

Establishment of the plate current characteristic region over which the video amplifier tube 24 is to operate is accomplished through adjustment of the tap 40 on potentiometer 42, the potentiometer being connected to form a bleeder to ground across a bias supply potential made available at terminal 50. The video signal including synchronizing information applied to the grid 52 of the kinescope 54 is also applied to the input of the sync separator and amplifier 56 via circuit path 58. In accordance with conventional television receiver design the output of the sync signal amplifier 56 is connected with the vertical and horizontal deflection driving generators 60 and 62 respectively. The functions of these deflections drive generators is to supply a suitable form of sawtooth voltage for conventional deflection of the electron beam in the kinescope 54. The output of the vertical deflection drive generator 60 is then applied to the vertical deflection output stage 64 which is indicated as being connected to the vertical deflection winding yoke 66 by terminal designations Y—Y, common to both elements. Whereas, the compounds of the deflection output stage 64 are conventional in nature and hence clearly representable in block diagram, the horizontal deflection output stage connected for excitation of the horizontal deflection yoke 69 is shown in more detail as it is to also serve, as hereinafter more fully described, in the capacity of a control for the subject AGC system as well as a pulse step-up power supply for acceleration of the electron beam kinescope 54.

Accordingly, the output of the horizontal deflection drive generator 62 is applied to the grid 70 of the vacuum tube 72, suitable grid return impedance being illustrated by resistor 74 connected with ground potential. The screen grid 76 is connected with a positive source of potential indicated by +s. g., while polarizing potential for the anode 78 is supplied through deflection output transformer primary winding 80, from a source of positive potential having a terminal indicated at 82. In a conventional manner the deflection signal for the deflection yoke winding 69 is supplied from the secondary winding 84 of the output transformer 86 by means of a suitable connection between the terminals of the elements 69 and 84 indicated at X—X. Across the secondary winding 84 there is provided a damping circuit 90 which is there placed to improve the efficiency and waveform produced by the deflection circuit.

In accordance with present day practice an autotransformer type winding 92 is connected with the primary winding 80 and also to the anode 94 of high voltage rectifier 96. The cathode 98 of the rectifier 96 is properly heated by energy derived from the deflection signal through the medium of secondary winding 100 on the output transformer 86. With the high voltage rectifier 96 so connected, the "flyback" impulse produced in the primary winding 80 of the horizontal output transformer 86 is magnified in amplitude through the action of the autotransformer winding 92 and rectified to provide a high unidirectional accelerating potential for application to the accelerating anode 102 of the kinescope 54 via circuit path 104. A capacitor 105 is shown connected from the accelerating anode 102 to ground to effect a storage and filtering action in cooperation with resistor 106.

It may be well noted at this time that with such an arrangement variations in beam current within the kinescope 54 will reflect through the rectifier 96 and subsequently through the autotransformer winding 92, connected with the primary winding 80, to reduce the amplitude of deflection voltage available at the output of secondary winding 84. With this in mind it is noted that also assocaited with the horizontal output deflection circuit transformer is an auxiliary secondary winding 108 which operates to supply a series of pulses 110 derived from the "kickback" phase of horizontal deflection circuit operation. Consequently, these pulses will also undergo amplitude changes with varying load conditions imposed upon the deflection circuit as a result of changes in beam current in the kinescope 54. As will be made clearer hereinafter, the pulses so derived from winding 108 are applied as keying pulses to an automatic gain control circuit.

According to the present invention, the keying pulses 110 derived from the auxiliary secondary winding 108 are applied through coupling capacitor 111 and circuit path 112 to the anode 114 of the diode 116. The anode 114 is also placed at some positive potential by its connection to +150 volts at power supply terminal 118 through load resistor 120. The diode cathode 122 is then appropriately placed at some negative potential relative to the anode 114 by its connection to cathode resistor 124 connected to tap 126 of the potentiometer 128. Adjustment of the potential of the cathode 122 may be made by positioning the tap 126 on the potentiometer 128 since the potentiometer in combination with the resistor 130 forms a bleeder to a ground across the +150 volt power supply terminal 118. Inasmuch as the diode is then placed under conditions for conduction, the pulses 110 will be conducted therethrough and developed across the cathode load resistor 124 to produce a series of negatively extending amplitude limited pulses 110A on the cathode 132 of AGC triode 134. The value of the limiting action so obtained will be made manifest upon consideration of the operation of the AGC as a whole. However, it can be clearly seen that as the negatively extending keying pulses 110 become sufficiently great in amplitude to swing or to drive the anode 114 to a potential equal to, or more negative than the cathode 122, the diode 116 will then establish a limiting action due to non-conduction.

The operation of the automatic gain control circuit will be shown for the purpose of explanation as being of the type disclosed in the aforementioned U. S. patents supra. It is to be noticed that the video signal at the output of the video amplifier 24 applied to the synchronizing separator amplifier 56, is obtained through the same circuit path 58 through which energy is applied to the grid 138 of the AGC triode 134. The form of the video signal voltage here applied by amplifier 24 is illustrated by the curve 140 shown in time relationship with the application of the amplitude limited keying pulses to the cathode 132 as derved from the horizontal output transformer auxiliary winding 108. Accordingly, it is seen that the keying pulses 110A so applied to the cathode 132 of the vacuum tube 134 are not only in a direction to drive the cathode negatively during their generation but are timed relative to the received video signal 140 to occur during the "back porch" interval 141 of the blanking and synchronizing signal pedestal combination. Since the D. C. potential applied to the grid 52 of the kinescope 54 is positive with respect to ground by an amount equal to the difference between +150 volts and the voltage drop across the elements 28, 30, and 34, the cathode 53 of the kinescope 54 and the cathode 132 of tube 134 must be placed at a positive potential in excess of their associated grid potentials. In the case of the kinescope 54, a conventional form of brightness control is shown comprising potentiometer 145 connecting in series with the bleeder resistor 146 and a positive potential source 148 of +150 volts. Therefore, by adjustment of the tap 150 of the potentiometer 145, the negative bias on the grid 52 of the kinescope 54 may be varied to control the brightness or intensity of the beam within.

In the case of the AGC vacuum tube 134, the cathode 132 has been shown as being connected to a positive potential which is considerably in excess of that existing on the grid 138 by the connection of the cathode 132 with the upper end of the load resistor or cathode resistor 124, which is in turn connected with the potentiometer tap 126. Consequently, positioning of the tap 126 on the potentiometer will not only permit adjustment of operating potential of the diode 116 but also allow a variable net negative bias to be applied to the grid 138 of the AGC triode. In normal operation of the present exemplary form of automatic gain control this level is established so as to produce plate current cut-off in the vacuum tube 134 during the absence of the amplitude limited negatively extended keying pulses 110A.

Under such bias cut-off conditions if the keying pulses 110A (poled to drive the cathode 132 negatively) are of sufficient amplitude they will overcome the negative cut-off bias on the tube 134 and establish plate current conduction during intervals of their production. Correspondingly, then with the arrangement shown herein, the keying pulses 110*a* occur once during each blanking interval and are phased with the back porch portion thereof so that the tube 134 will be rendered conductive during this back porch period. Inasmuch as the blank out signal 141 extended in a negative direction on the grid 138, the net plate current pulses in vacuum tube 134 due to the combined effect of signals 140 and 110A will be of an amplitude inversely proportional to the blanking level during keyed operation of the tube 134. Since the current pulses in the plate load resistor 152 are inversely proportional to the received black level signal, the negatively extending plate voltage pulses 154 will then also be inversely proportional in amplitude to the received video signal black level (corresponding to the back porch or pedestal portion of the signal). As the pulses 110A are of constant amplitude, a reduction in received signal strength attended by a decrease in the amplitude of the video signal 140 will permit the pulses 110A to drive the tube 134 into a heavier state of conduction and hence produce greater amplitude plate voltage pulses 154. Conversely, an increase in signal strength during the keyed conduction of the vacuum tube 134 will operate to reduce the amplitude of the plate voltage pulses 154.

The negatively extending pulses 154 are then applied through coupling condenser 156 to the anode 158 of a diode 160. The anode 162 of this diode and the cathode thereof are connected through suitable load resistors 164 and 165. The pulses 154 extending in a negative direction thereby cause conduction of the diode 160 with a consequent development of a unidirectional voltage across load resistor 164 across which is placed storage condenser 166. Therefore, the voltage developed across the resistor 164 is proportional to the amplitude of the applied pulses 154 and consequently this potential must vary inversely with received video signal. Accordingly, the potential so developed across resistor 164 is connected to the grid 167 of the D. C. amplifier 168 having its anode 170 connected through load resistor 172 to ground potential. The D. C. amplifier 168 is in turn rendered operative by connection of its cathode 174 through load resistor 176 to a −100 volts made available at terminal 178. This permits development of a suitable AGC voltage across resistor 172 which may then be applied to the R. F. and I. F. sections of the television receiver through AGC bus 175. It may be noted that the series condenser resistor combination 178 is placed across the storage condenser 166 to provide a conventional damping action and thereby discourage oscillating or motorboating of the automatic gain control circuit.

The AGC action thus obtained is readily discernible through consideration of the various circuit responses under the conditions attending a reduction in signal strength at the grid 52 of the kinescope 54. In such case, the video signal 140 as applied to the AGC triode grid 138 would be reduced in amplitude and consequently effect an increase in the amplitude of the voltage pulses 154 appearing at the anode of the triode 134. As a result, the voltage across the storage capacitor 166 will increase and thereby cause the negative voltage with respect to ground already existent on the grid 167 to become more negative. This increase in the negative bias on the D. C. amplifier 168 will then cause its output voltage appearing across resistor 172 to become more positive and thereby apply less negative bias through the AGC bus 175 to the R. F. and I. F. amplifiers included in the block 10. This decrease in negative bias causing an increase in amplifier gain consequently corresponds to the decrease in signal strength.

Under the conditions cited above if the signal strength should remain constant and the picture background level become brighter, more energy would be required of the horizontal deflection circuit by the electron beam with the kinescope 54. Therefore, were it not for the limiting action provided by the novel application of the diode 116 to the AGC system in accordance with the present invention, the applied pulses 110A would necessarily decrease in amplitude as a result of the reduction in amplitude of the pulses 110 developed across the winding 108. This would result in a decrease in amplitude of the voltage pulses 154 appearing at the anode of the AGC triode 134 and would in effect be the equivalent of an increase in signal strength. Therefore, the voltage across storage capacitor 166 would be reduced in magnitude and provide less negative bias to the D. C. amplifier grid 167 which in turn will cause the voltage at the anode 170 to become more negative. This action reduces the gain of the receiver, thereby tending to maintain the average illumination of the kinescope screen at a constant level, which is of course highly undersirable. With the present invention, however, as shown in Figure 1 if the amplitude of the pulses 110 is initially established sufficiently in excess of the plate cathode potential difference in the diode 116, such improper action will be obviated through the application of a constant amplitude keying pulses 110A to the AGC triode 134.

Figures 2, 3, 4:
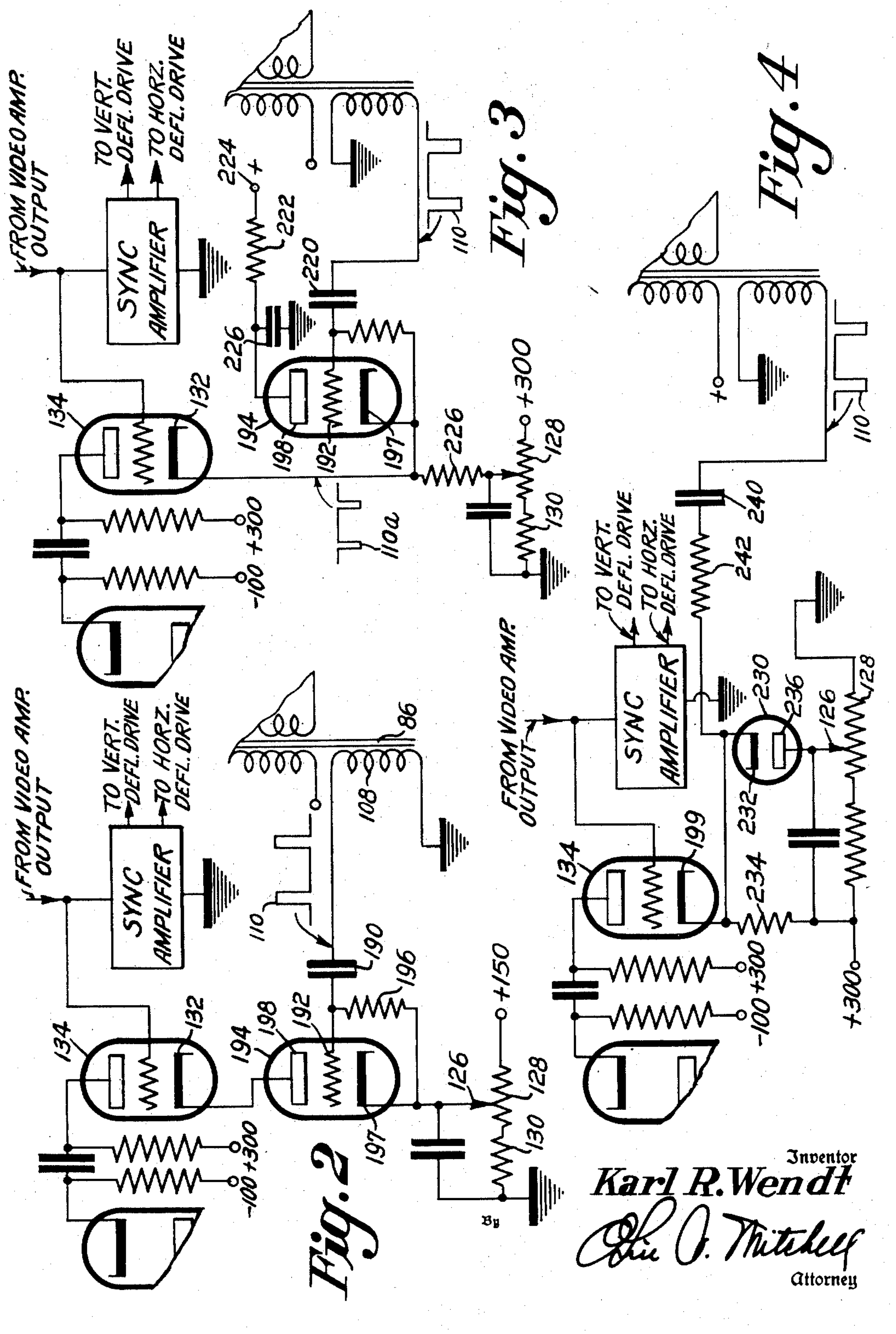
Figure 2 shows another form of practicing the present invention in connection with the receiving circuit shown in Figure 1.
Figure 3 shows another embodiment of the present invention as practiced in connection with a conventional television receiver of a type depicted in Figure 1.
Figure 4 illustrates still another embodiment of the present invention as adopted to the receiving arrangement shown in Figure 1.

Another method of obtaining a suitable limiting action in connection with the specific form of automatic gain control shown in Figure 1 is illustrated in Figure 2. Here the variable amplitude pulses 110 derived from the auxiliary winding 108 on the horizontal output transformer 86 are poled in a positively extending direction and applied through coupling capacitor 190 to the grid 192 of limiter triode 194. A suitable impedance 196 is connected between the grid 192 and the cathode 197 of the limiter triode to permit grid current limiting of the applied pulses 110. The AGC triode 134 is then supplied with a video signal in exactly the same manner as shown in Figure 1, but the cathode 132 thereof is now connected with the anode 198 of the limiter triode 194. Since the cathode 197 of the limiter triode is supplied with a suitable positive potential by means of tap 126 on potentiometer 128, the limiter triode 194 acts as a variable cathode resistance connection in lieu of resistance 124 in Figure 1. Consequently, if the pulses 110 applied to the grid 192 of the limiter triode are adjusted to be always in excess of that necessary to drive the grid 192 positive with respect to the cathode 197, grid current through the resistor 196 will limit the maximum degree of conductance exhibited by the triode 194 and hence apply to the cathode 132 constant amplitude keying pulses.

Study of embodiments of Figures 1 and 2 will reveal that the horizontal deflection system must supply a certain amount of energy to the AGC system in its provision of keying pulses therefor. For example, in Figure 1 keying pulse energy will be dissipated across the resistor 124 located in the cathode circle of the AGC triode 134. Again in Figure 2, although the amount of keying pulses of energy required here is substantially less than in Figure 1, it is apparent that grid current through resistor 196 will represent a certain amount of power loss.

The embodiment of Figure 3, however, demands even less keying pulse energy since no grid current in the limiting triode is caused to flow. Here it can be seen that the keying pulse 110 is applied through coupling capacitor 220 to the limiting triode grid 192 in a negatively extending direction. The pulses 110 are of substantially greater amplitude than that required to drive the triode 194 to plate current cut-off. Adjustment of the required pulse amplitude for achievement of cut-off may be made by varying the value of dropping resistor 222 which applies operating potential to the plate 198 of the limiter triode power supply terminal 224. The bypass condenser 226 places the plate 198 at a substantially A. C. ground potential. It can be seen then that since the cathode 197 is connected with the cathode resistor 226 which is included in the cathode circuit of the AGC triode 134, plate current cut-off of the triode 194 will define the most negative extent of the limited pulses 110A appearing on the cathode 132 of the AGC triode. Thus, with proper adjustment of circuit parameters variation in amplitude of the pulses 110 will not be evidenced in the amplitude of the keying pulses 110A actually keying the AGC triode 134 and hence will not affect operation of the AGC system.

The arrangement of Figure 4 utilizing the keying pulses as derived from the horizontal deflection in the negatively extending direction as was the case in Figure 3, but however considerably more power is required for the operation of the limiting circuit and the keying of the AGC triode inasmuch as a diode 230 is employed as a peak saturation type of limiter. Here the cathode 232 of the diode is connected with the cathode 197 of the AGC triode and the cathode resistor 234 is common to both the cathode circuit of the AGC triode 134 and the load circuit for the diode 230. The amplitude of the pulses 110 coupled to the diode cathode 232 through coupling capacitor 240 and resistor 242, are of sufficient amplitude to drive the cathode 232 negatively with respect to the diode anode 236. Therefore adjustment of the tap 126 on the potentiometer 128, which adjusts the degree to which the anode 236 is placed initially negative with respect to the cathode 232, establishes control over the amplitude of the limited version of the keying pulses applied to the cathode 199 of the AGC triode. If the amplitude of the pulses on anode 232 tends to increase the diode 230 will be forced into greater conduction and therefore limit the pulse amplitude appearing at the cathode 199 by an increase in pulse voltage drop across resistor 242.

Although in the description and illustration of the above embodiments of the present invention, reference has been made to discrete operating potentials for various portions of the circuit arrangements shown, it is to be understood that these potentials are merely exemplary in magnitude and polarity and that suitable changes therein with proper regard to the teachings of the present invention will provide equally satisfactory results. Furthermore, the source of varying amplitude keying pulses has been shown as being provided by an auxiliary winding 108 on the horizontal deflection circuit of the transformer in all of the above embodiments. It is to be noted that in deflection circuits of the type well-known to the art, there are numerous terminals from which suitable keying pulses may be derived and therefore such an auxiliary winding although being conveniently free of any D. C. potentials is merely shown by way of example and its use is in no way intended to limit the practice of the present invention. Attention is also directed to the fact that although the keyed AGC system herein employed and described in connection with the use of the present invention is of the inverted type as disclosed by me in the above cited U. S. patent applications, the utility of the present invention is not confined solely thereto. There are other keyed forms of AGC circuits presently known which will substantially benefit through the application of this system.

From the foregoing description, it can be seen that the applicant has provided a simple, novel, economical and useful improvement in keyed forms of AGC systems and more particularly to those systems in which keying pulse information is to be derived from an associated kinescope deflection circuit operating to supply both beam deflection energy as well as beam accelerating energy.

What is claimed is:

In a television receiver adapted to receive a series of image signals interspersed with regularly recurrent black level signals, said receiver incorporating a combination kinescope power supply circuit for simultaneously supplying kinescope beam deflection signal energy as well as kinescope beam deflection accelerating potential, an automatic gain control circuit comprising in combination a variable conductance device, means maintaining said variable conductance device in a state of minimum conduction, circuit connections to the combination kinescope power supply for deriving therefrom a series of keying pulses recurring in synchronism with the received black level signals, said pulses having amplitude characteristics which are a function of the loading imposed upon the combination power supply, a first and second pulse amplitude responsive means for controlling the conductance of the variable conductance device, connections applying the received black level signals to said first pulse amplitude responsive means, a pulse amplitude limiting circuit to the input of which are applied said keying pulses, circuit connections applying the output of said amplitude limiting circuit to said second pulse amplitude responsive means for keying said variable conductance device into exhibiting a greater degree of conductance during the active periods of said pulses, and means for developing an automatic gain control potential in accordance with the conductance displayed by the variable conductance device during the intervals in which said keying impulses are active to increase the conductance of said conductance device.

KARL RINNER WENDT.

References Cited in the file of this patent

UNITED STATES PATENTS

| Number | Name | Date |
| --- | --- | --- |
| 2,259,538 | Wheeler | Oct. 21, 1941 |
| 2,303,909 | Blumlein | Dec. 1, 1942 |
| 2,307,375 | Blumlein et al. | Jan. 5, 1943 |
| 2,307,387 | Blumlein | Jan. 5, 1943 |

FOREIGN PATENTS

| Number | Country | Date |
| --- | --- | --- |
| 520,584 | Great Britain | Apr. 29, 1940 |
| 873,623 | France | July 15, 1942 |
| 845,897 | France | Sept. 4, 1939 |